3,296,715
SELF-LOADING SCRAPER
John E. Jass and Robert J. Sullivan, Peoria, Ill., assignors to Caterpillar Tractor Co., Peoria, Ill., a corporation of California
Filed Sept. 12, 1963, Ser. No. 308,446
3 Claims. (Cl. 37—8)

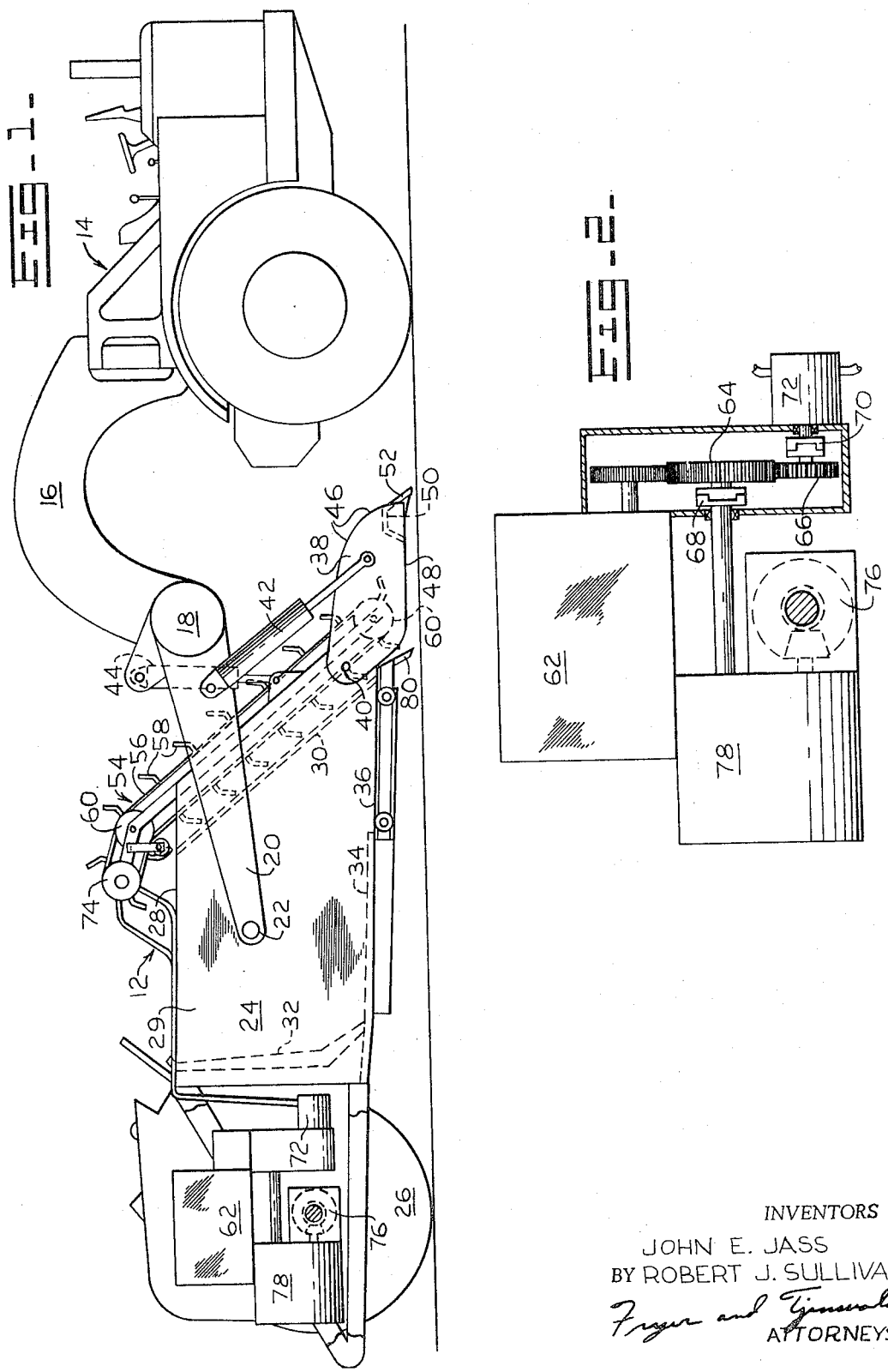

The present invention relates to self-loading scrapers in which a conveyor receives excavated earth and dumps it into the open top of a main scraper bowl, and in which a power train associated with the scraper and separate from the power driving the tractor is selectively operable to drive the conveyor during the excavating operation or the scraper wheels during transport.

In conventional self-loading scrapers a scraper bowl is provided at its front with a conveyor. The lower end of the conveyor is ordinarily disposed forwardly of the cutting edge on the bowl, and the conveyor is operated in a manner to force material between the bottom of the conveyor and the cutting edge and lower front edge of the bowl, thereby expediting the loading operation. Large rocks and other material, not having been previously broken, tend to damage the conveyor as the rocks are forced into the bowl unless the conveyor is provided with some type of relatively complicated floating mechanism to accommodate these large bodies. Also, as the bowl becomes filled to capacity, leakage, particularly of relatively loose or fine excavated material, tends to occur at the front of the bowl which is closed only by the relatively open conveyor. In addition the conveyor in conventional self-loading scrapers is normally driven by a power takeoff from the towing tractor. This reduces available horsepower during the loading cycle, and also may reduce horsepower during the transport cycle since it may be necessary to continue operation of the conveyor after loading and during transport to prevent leakage through the relatively open conveyor.

In accordance with the present invention a self-loading scraper is provided with a main bowl, open at its top, closed on its sides, front and rear and normally closed at its bottom. An auxiliary bowl is pivoted to the lower front of the main bowl and provided with a cutting edge on its lower front. Means are provided for vertical adjustment of the main bowl and also to raise and lower the auxiliary bowl relative to the main bowl. A conveyor, including an endless belt with a plurality of spaced carriers or flights, communicates the auxiliary bowl with the open top of the main bowl to receive excavated material in the auxiliary bowl and deposit it in the open top of the main bowl. The lower end of the conveyor disposed within the auxiliary bowl is located rearwardly of the cutting edge on the auxiliary bowl. Finally, power means separate from the power driving the propelling tractor, is provided for the scraper and is selectively operable to drive either the conveyor or the scraper wheels.

One object of the present invention is to provide a self-loading scraper having a cutting edge for excavating and breaking material disposed forwardly of the conveyor to protect the latter.

Another object and feature is that the excavated material is picked up and elevated to the top of the bowl rather than being forced rearwardly into the bottom of the bowl. In this connection a number of advantages appear. Since the earth or material excavated is dumped into the top of the bowl rather than forced into the bottom, frictional resistance of the material against the sides of the bowl together with the overlying weight of the mounting load is eliminated, thus facilitating loading. The danger of damage to the conveyor where large unbroken material such as rocks is forced between the conveyor and the forward end of the main bowl is eliminated, as also is the necessity for relatively expensive and delicate floating mechanism to alleviate the situation where the material is forced into the bottom of the main bowl.

The open top, closed sidewall construction of the main bowl eliminates leakage of loose material through the conveyor, and accordingly it is not necessary to drive the conveyor during the transport period, or other than in the loading operation.

The rigid, as distinguished from floating, attachment of the conveyor to the bowl strengthens the bowl construction by serving as a spreader beam.

The provision of power means for the scraper, separate from the tractor power avoids loss of tractor power during the loading operation and during the transport may be used to drive the scraper for a faster operation.

The foregoing and other objects will be appreciated upon reading the following specification in connection with the accompanying drawings wherein:

FIG. 1 is a side elevation of one embodiment of a self-loading scraper drawn by a tractor; and FIG. 2 schematically illustrates a power mechanism for the scraper, selectively operable to drive either the conveyor or the scraper wheels.

The drawings illustrate a scraper 12 drawn by a two-wheel tractor 14. The tractor 14 drawns the scraper which includes an articulated gooseneck 16 attached to a spreader bar 18 carrying arms 20 pivoted as at 22 to the main bowl 24 of the scraper. The scraper is supported by a pair of wheels, one of which is shown at 26.

Main bowl 24 is open at its top 28 and closed at its sides 29, at its front as by upwardly and rearwardly inclined front wall 30, and at its rear by an ejector plate 32. Bottom 34 is normally closed and includes a slidable door 36 which may be opened by suitable linkage not illustrated.

An auxiliary bowl 38 is pivoted as at 40 to the lower front of main bowl 24 and is vertically adjustable relative to the main bowl by jack 42 through controls not illustrated. Main bowl 24 is also vertically adjustable by jack 44, through controls not illustrated.

Auxiliary bowl 38 is open at its top-front 46 and bottom 48 and forwardly spaced by cross beam 50 which carries a cutting edge 52. A conveyor 54 communicates auxiliary bowl 38 with the open top 28 of the main bowl. The conveyor includes an endless belt 56 provided with a plurality of spaced bucket-like carriers 58 carried by a plurality of drive and idler rollers 60.

FIG. 2 schematically illustrates the power drive provided for the scraper. An engine 62 drives gears 64 and 66, which through clutches 68 and 70, selectively drives pump 72 to operate motor 74 driving conveyor 54, or clutch 68 may be engaged and clutch 70 disconnected to operate the differential 76 and wheels 26 through transmission 78.

During the loading cycle clutch 68 is disengaged and clutch 70 is engaged to drive conveyor 54. Jacks 42 are extended to lower cutting edge 52 of auxiliary bowl 38 to engage the ground. Earth is collected on carriers 58 of conveyor 54 which is operating in a counterclockwise direction and the earth is dumped into the open top 28 of main bowl 24. When the main bowl has been filled to capacity clutch 70 is disconnected and clutch 68 is engaged to drive wheels 26 while auxiliary bucket 38 is raised out of contact with the ground. The unit is then driven to a dump area, sliding bottom 36 is moved rearwardly through linkage not illustrated to open the front portion of the bottom of the main bowl, and ejector plate 32 is driven forwardly by jacks, not shown, to eject the load through the open bottom. A strike-off plate 80 on slidable bottom 36 serves to spread and level the dumped load.

Auxiliary bowl 38 is disclosed and heretofore described as having an open bottom and as being pivotally supported on the main bowl. It is recognized, however, that under some conditions it may be desirable to provide a bottom wall in auxiliary bowl 38 to prevent material being loaded from sliding on the surface of the ground. It is also recognized that auxiliary bowl 38 may be provided as a rigid extension of main bowl 24 with the position of cutting edge 52 being adjusted by actuation of jack 44.

Although the foregoing invention has been described in some detail for purposes of clarity, it will be appreciated that certain modifications may be practiced without departing from the spirit of the invention as limited only by the appended claims.

What is claimed is:

1. Excavating equipment of the type including a tractor and a scraper and wherein the scraper comprises: a main bowl open at its top, supported by wheels and closed by an upwardly and rearwardly inclined front wall, a pair of side walls, and an ejector plate, and a bottom selectively openable to discharge material received therein; means for raising and lowering the main bowl; an auxiliary bowl pivoted forward of said front wall including means for effecting vertical adjustment of said auxiliary bowl relative to said main bowl; a conveyor including a belt mounted independently of said auxiliary bowl whereby vertical adjustment of said auxiliary bowl does not affect the position of said conveyor, said conveyor having spaced bucket flights thereon communicating said auxiliary bowl with the open top of the main bowl; and a cutting edge transversely spanning the auxiliary bowl across the bottom edge of the open front and disposed forwardly of said conveyor.

2. Excavating equipment of the type including a tractor and scraper wherein the scraper comprises: a main-bowl closed on its sides, front and rear and having an open top, wheels for said scraper, an auxiliary bowl extending forwardly of the main bowl, a cutting edge along the lower front edge of said auxiliary bowl, a conveyor including an endless belt carrying a plurality of spaced carriers mounted independently of said auxiliary bowl and operative to communicate said auxiliary bowl with the open top of said main bowl, means for vertical adjustment of said auxiliary bowl independently of said conveyor, and power means carried by said scraper and selectively operable to drive said conveyor or said wheels.

3. Excavating equipment of the type including a tractor and a scraper and wherein the scraper comprises: a main bowl open at its top, supported by wheels; an auxiliary bowl extending forwardly of said main bowl, means for effecting vertical adjustment of said main and auxiliary bowls; a conveyor including a belt having spaced carriers thereon communicating said auxiliary bowl with the open top of the main bowl; means mounting said conveyor on said scraper independently of said auxiliary bowl whereby vertical adjustment of said auxiliary bowl does not affect the position of said conveyor; a cutting edge transversely spanning the auxiliary bowl across the bottom edge of the open front and disposed forwardly of said conveyor.

References Cited by the Examiner

UNITED STATES PATENTS

| 2,363,178 | 11/1944 | Harbers et al. | 37—124 |
| 2,546,907 | 3/1951 | Sherwood | 37—8 X |
| 2,791,041 | 5/1957 | Hancock | 37—8 |
| 2,994,976 | 8/1961 | Hancock | 37—8 X |
| 3,030,714 | 4/1962 | Sassmann et al. | 37—126 |
| 3,210,868 | 10/1965 | Liess | 37—8 |

ABRAHAM G. STONE, *Primary Examiner.*

R. L. HOLLISTER, *Assistant Examiner.*